United States Patent [19]

Tsai

[11] Patent Number: 5,113,057

[45] Date of Patent: May 12, 1992

[54] DOUBLY-CONTROLLED AQUARIUM SAFETY HEATER

[76] Inventor: Hsien-Tang Tsai, P.O. Box 55-1670, Taipei (10477), Taiwan

[21] Appl. No.: 633,123

[22] Filed: Dec. 24, 1990

[51] Int. Cl.$^5$ .......................... H05B 3/80; H05B 1/02
[52] U.S. Cl. .................................. 219/523; 219/497; 219/506; 392/498; 392/447
[58] Field of Search ............... 219/523, 497, 506, 501, 219/499; 338/196–199; 392/498, 447

[56] References Cited

U.S. PATENT DOCUMENTS

| | | | |
|---|---|---|---|
| 1,981,251 | 11/1934 | Roth | 219/523 |
| 3,107,290 | 10/1963 | Willinger | 219/523 |
| 3,746,836 | 7/1973 | Summerfield | 219/523 |
| 3,803,386 | 4/1974 | Rodrigues | 219/523 |
| 3,890,486 | 6/1975 | Fitzgerald | 219/523 |
| 3,895,217 | 7/1975 | Hall | 219/523 |
| 3,896,289 | 7/1975 | Di Renna | 219/523 |
| 4,021,643 | 5/1977 | Hall | 219/523 |
| 4,072,847 | 2/1978 | Craven | 219/523 |
| 4,379,220 | 4/1983 | Middleman | 219/523 |

Primary Examiner—Teresa J. Walberg

[57] ABSTRACT

An aquarium heater includes a heating coil and a thermostat formed in a glass tube, a thermo-sensitive resistor distantly connected to the thermostat for ensuring a reliable sensing of water temperature in the aquarium without being thermally influenced by the heating coil, and a thermal type circuit breaker provided in a circuit of the thermostat and the heating coil for safely switching off a power supply to the heating coil once the thermostat is out of order to prevent killing of fishes raised in the aquarium.

2 Claims, 3 Drawing Sheets

DOUBLY-CONTROLLED AQUARIUM SAFETY HEATER

BACKGROUND OF THE INVENTION

A conventional heater used in an aquarium as shown in FIG. 1 includes: a glass tube 1 having a heating coil 11 provided in a lower portion of the tube placed in the water of the aquarium, a thermo-sensitive resistor R1 and a heating indicator lamp 111 formed in the tube 1, a controller 2 having a thermostat 20 provided in a casing 200 having a variable-resistance adjusting knob VR1 rotatably formed on the casing 200 for setting a warm temperature of the thermostat 20, and a power source PS for powering the heater connected to the tube 1 through an adapter 120 formed on a cap 12 sealing the glass tube 1. The heater may serve for keeping a constant warm temperature in an aquarium for raising fishes.

However, such a conventional aquarium heater has the following drawbacks:

1. The thermostat 20 is provided in the casing 200 of controller 2 to occupy a large space, influencing the installation of other equipments such as light, filter, and air blower required for an aquarium and also spoiling their esthetic appearance.

2. The thermo-sensitive resistor R1 is provided in the glass tube 1 for sensing water temperature for activating the heating coil 11 as controlled by the thermostat 20. However, the resistor R1 is very near the heating coil 11 which is also provided in the glass tube 1 so that the resistor R1 may sense an incorrect signal of water temperature as thermally influenced by the heating coil 11 to falsely and unexpectedly switch off the heating operation of the coil 11 when heating is required.

3. An electric circuit for controlling and heating the aquarium is not provided with additional safety device so that once the controller 2 is out of order, the heating coil 11 will not be switched off, thereby continuously increasing water temperature and possibly killing fishes.

The present inventor has found the drawbacks of the conventional aquarium heater and invented the present aquarium safety heater.

SUMMARY OF THE INVENTION

The object of the present invention is to provide an aquarium heater including a heating coil and a thermostat formed in a glass tube, a thermo-sensitive resistor distantly connected to the thermostat for ensuring a reliable sensing of water temperature in the aquarium without being thermally influenced by the heating coil, and a thermal type circuit breaker provided in a circuit of the thermostat and the heating coil for safely switching off a power supply to the heating coil once the thermostat is out of order to prevent killing of fishes raised in the aquarium.

DETAILED DESCRIPTION

Figure 1:
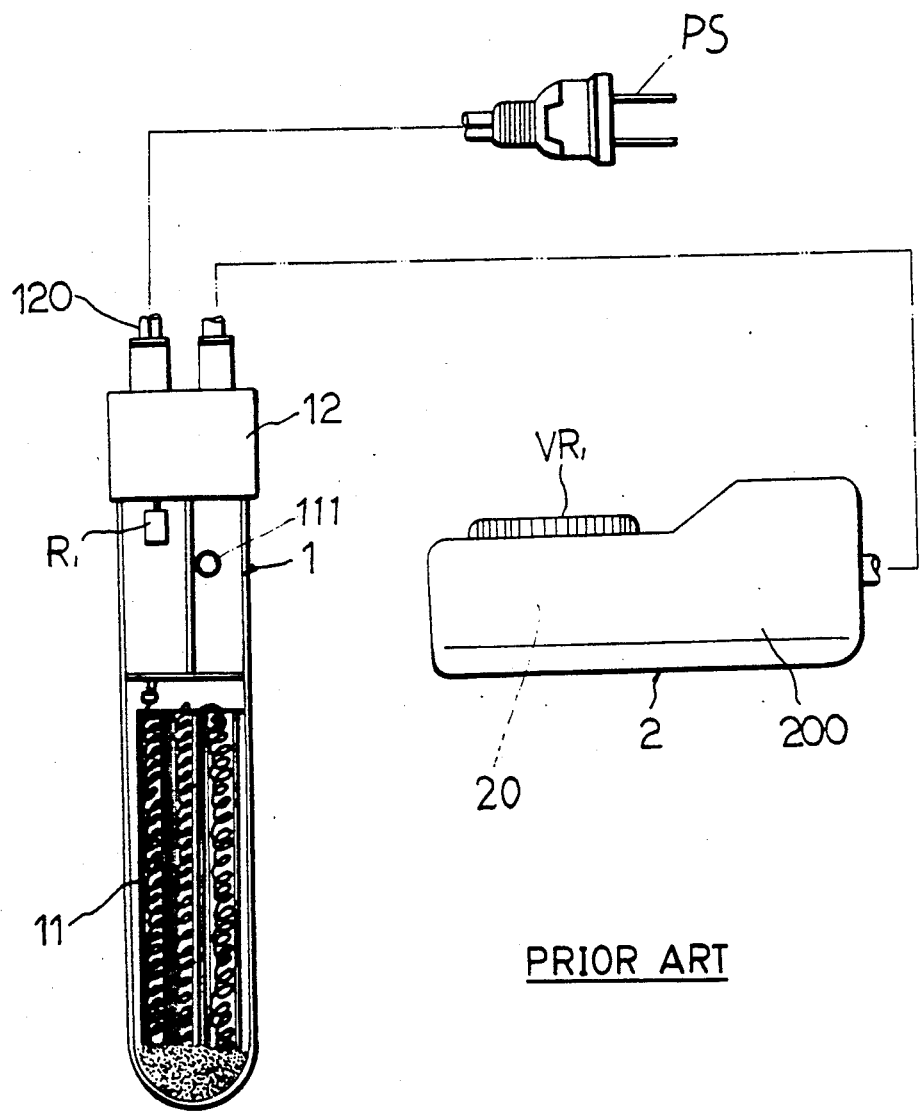
FIG. 1 shows a prior art of a conventional aquarium heater.
Figure 2:
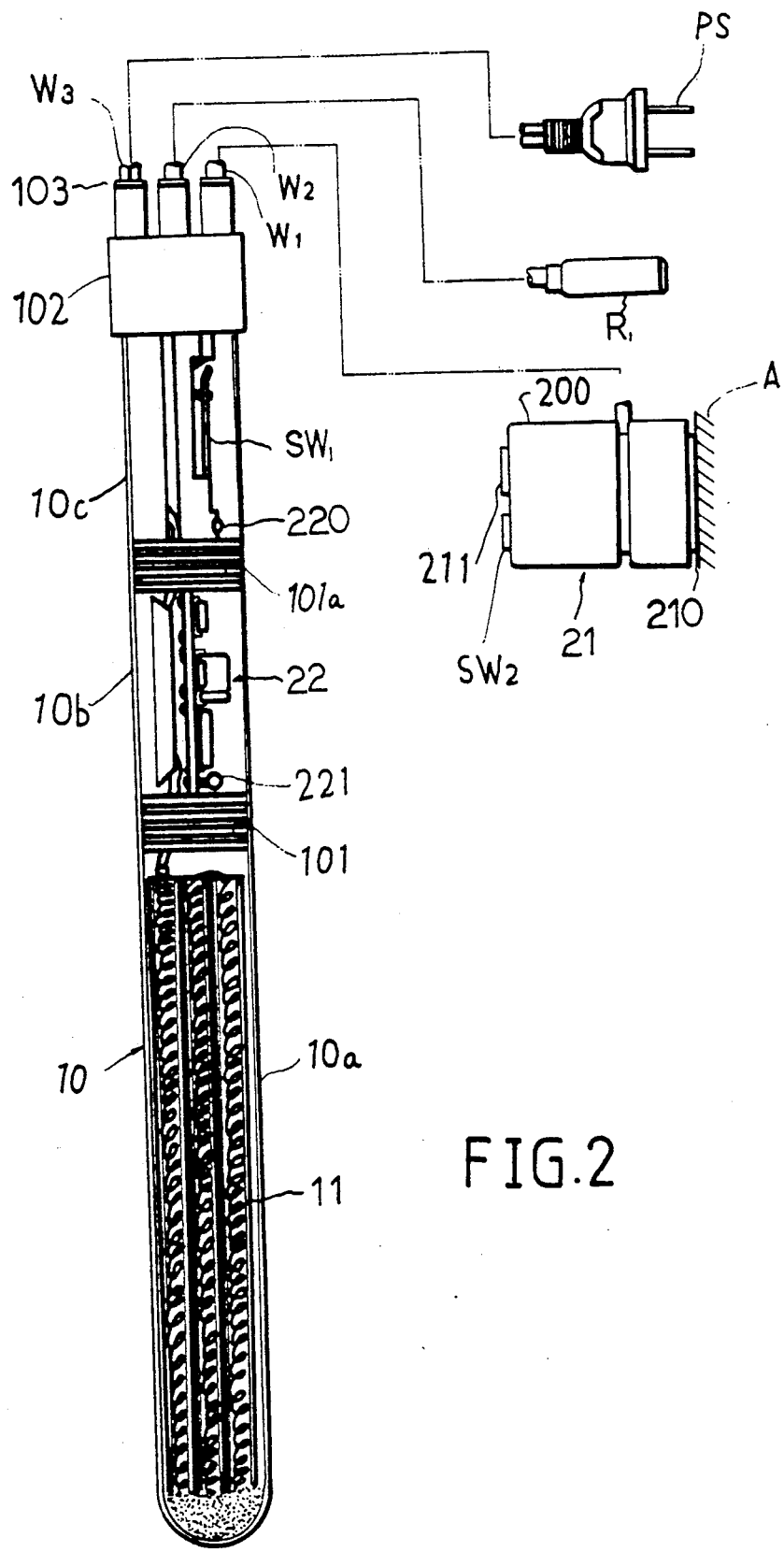
FIG. 2 is an illustration of the present invention.
Figure 3:
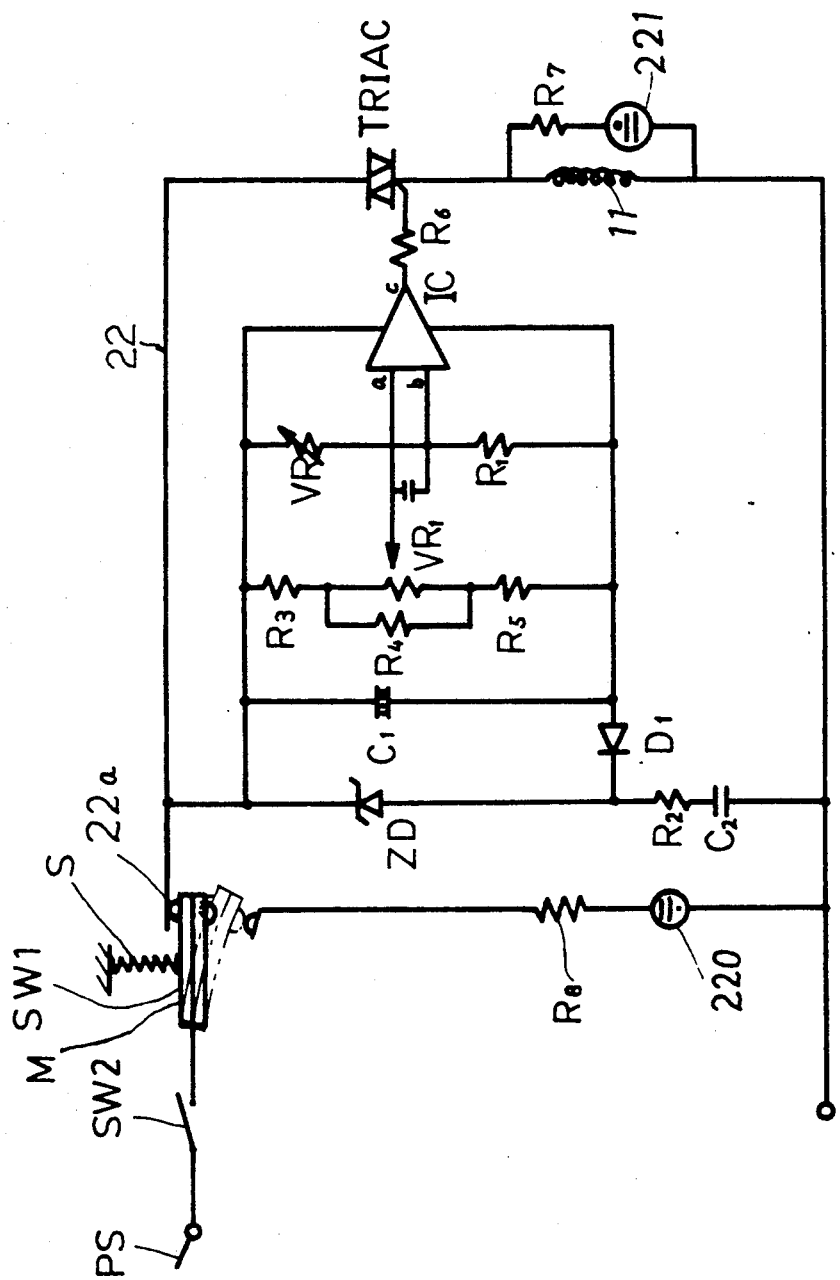
FIG. 3 is a circuit diagram of the present invention.

As shown in FIGS. 2, 3, the present invention comprises: a glass tube 10 submerged in an aquarium filled with water, a heater coil 11, an electric controller 21, and a power source PS which may be an alternating current AC.

The glass tube 10 includes a lower section 10a for installing the heating coil 11 therein, a middle section 10b, an upper section 10c, a cap 102 formed on a top portion of the tube 10 for sealing the tube 10, and a plurality of adapters 103 formed on the cap 102 for connecting power source PS and controller 21 by wires. The lower section 10a is separated from the middle sectin 10b by a first insulator partition plate 101, whereas the upper section 10c is separated from the middle section 10b by a second partition plate 101a.

The electric controller 21 is shown in a circuit diagram as shown in FIG. 3, and includes: a thermostat 22 formed in the middle section 10b of the glass tube 10, an adjusting knob 211 for adjusting variable resistance rotatably formed in a casing 200 of the controller 21 distantly connected to the thermostat 22 formed in the tube by a wire W1, a thermal type circuit breaker SW1 formed in the upper section 10c of the glass tube 10, and an on-off switch SW2 formed on the casing 200 for switching on or off of the power source PS connected to the glass tube by wire W3 through adapter 103. The casing 200 may be adhered on a back portion or a small corner of an aquarium tank A by a tape or adhesive 210.

The thermostat 22 includes: a rectifying circuit comprised of a diode D1, a Zener diode ZD, capacitors C1, C2, and a resistor R2 formed in a left portion of the circuit as shown in FIG. 3 for rectifying AC current to direct current for powering the thermostat 22; a variable resistor VR1 of the adjusting knob 211 connected across two poles of the power source PS through several resistors R3, R4, R5; an integrated circuit of voltage comparator IC electrically connected with the power source having a first input pin a of comparator IC connected to an output of the variable resistor VR1; a thermo-sensitive resistor R1 electrically connected to power source and distantly connected to a second input pin b of comparator IC through a wire W2 which resistor R1 is served as a sensor for sensing water temperature in the aquarium and can be poked into any area inside the aquarium by means of the wire W2, a bidirectional triode thyristor TRIAC having a gate connected to an output pin C of comparator IC through a resistor R6 and having two terminals of TRIAC connected to the two poles of power source PS through the heating coil 11 of which a heating indication lamp 221 is parallelly connected with the coil 11 by a resistor R7 and is formed in the middle section 10b of the glass tube 10.

The thermal type circuit breaker SW1 includes a bimetallic element M normally resiliently contacting a terminal 22a of the thermostat 22 by a spring S, a warning lamp 220 operatively contacted with the bimetallic element M when overheated by the heated coil 11 when the thermostat 22 is out of order unable to switch off the coil 11 which lamp 220 is then powered by power source through a resistor R8 as shown in dotted line of FIG. 3. The warning lamp 220 may be formed in the upper section 10c and formed as red color to be different from a green color (for instance) of lamp 221 which is provided in the middle section 10b indicating a normal warm up by the coil 11.

In using the present invention, an expected water temperature can be preset by adjusting the knob 211 to a pre-determined resistance of variable resistor VR1 which is input to the first pin a of comparator IC. Upon the powering of the present invention by switching on switch SW2, the thermo-sensitive resistor R1 will sense a voltage signal of water temperature in the aquarium and is input to the second pin b of comparator IC to compare a voltage value preset by VR1. If the sensed temperature is lower than the preset value as compared in the comparator IC, an output voltage signal from comparator IC (pin C) will trigger the triode thyristor TRIAC to conduct TRIAC to power the heating coil 11 for warming up the water in the aquarium. The heating indication lamp 221 is lit to indicate the coil 11 being performing heating operation.

When the water temperature reaches a pre-determined value, two inputs (a,b) of comparator IC are equal so that the output of IC will be inverted without triggering the TRIAC and without powering the coil 11. The heating indicator lamp 221 will also be switched off. The coil 11 is off to prevent overheating of aquarium water for safely protecting the raised fishes.

When the thermostat 22 is out of order which can not switch off the coil 11 under heating, the bimetallic element M of circuit breaker SW1 will be thermally biased to disconnect the circuit of thermostat 22 and to contact and close the circuit of warning lamp 220, reminding of an expected repair work. Other modifications of the lamp 220 and switch SW1 can be made in this invention without departing from the spirit and scope of this invention.

In the circuit of thermostat 22, the capacitor C2 and resistor R2 will serve for filtering off any interference waves not expected in this invention. The capacitor C1 across the Zener diode ZD will hold the input voltage during initial turn-on to allow the diode ZD time to conduct and prevent a false triggering of TRIAC, such as an instant triggering after an overheating situation without being cooled down.

The present invention is superior to a conventional aquarium heater with the following advantages:

1. The thermo-sensitive resistor R1 is distantly separated from the heating coil 11 to prevent a false sensing of the present invention.

2. The casing of adjusting knob 211 only occupies a small space without influencing the installation of other equipments needed by an aquarium.

3. Even the thermostat 22 is out of order, a further safety switch of breaker SW1 can stop power supply to the system.

I claim:

1. An aquarium safety heater comprising:

a glass tube submerged in an aquarium filled with water having a heating coil formed in a lower section of said glass tube;

an electric controller including a thermostat having a bidirectional triode thyristor operatively triggered by a voltage comparator integrated circuit formed in said glass tube insulatively partitioned from said heating coil for activating said heating coil for warming water in the aquarium, an adjusting knob formed in a casing adhered on the aquarium for adjusting a pre-determined resistance of a variable resistor input into a first input pin of the voltage comparator integrated circuit, a thermo-sensitive resistor distantly connected to said thermostat by a wire for poking the thermo-sensitive resistor into any area in the aquarium for sensing a voltage signal of water temperature in the aquarium to be input into a second input pin of said comparator integrated circuit for comparing two different input voltage signals for operatively outputing a voltage signal for triggering said triode thyristor for heating said coil, and a thermal type circuit breaker operatively switching off said thermostat when said thermostat is out of order; and a power source electrically connected to said electric controller through an adapter formed on a cap sealably formed on a top portion of said glass tube for powering said electric controller, said triode thyristor operatively deactivated for switching off said heating coil which is electrically connected between two poles of said power source through said thermostat when said thermo-sensitive resistor senses a voltage signal of a water temperature equal to a predetermined value of said variable resistor as compared by said comparator integrated circuit, the improvement which comprises:

said thermal type circuit breaker including a bimetallic element normally resiliently connected between a first pole of said power source and a first terminal of said thermostat, of which a second terminal of said thermostat is connected to a second pole of said power source, said bimetallic element thermally biased due to an increasing temperature in the aquarium when the thermostat is out of order to disconnect said first terminal of said thermostat from said first pole of said power source to disconnect said power source to said heating coil for safety purpose.

2. An aquarium safety heater according to claim 1, wherein a warning lamp is provided in said electric controller having a first terminal of said warning lamp normally separated from said bimetallic element which is connected to the first pole of said power source, said waring lamp having a second terminal connected to the second pole of said power source, whereby upon an increasing of an aquarium temperature when the thermostat is out of order, said bimetallic element is thermally biased to contact said first terminal of said warning lamp so as to electrically connect said warning lamp with said two poles of said power source for lighting said warning lamp for reminding a repair work.

* * * * *